(12) United States Patent
Mahaffy

(10) Patent No.: US 8,412,367 B2
(45) Date of Patent: Apr. 2, 2013

(54) FORMING VEHICLE BODY MODELS AND OTHER OBJECTS

(75) Inventor: Matthew James Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 426 days.

(21) Appl. No.: 12/765,905

(22) Filed: Apr. 23, 2010

(65) Prior Publication Data

US 2011/0264253 A1    Oct. 27, 2011

(51) Int. Cl.
  *G06F 19/00*    (2011.01)
(52) U.S. Cl. .................. 700/98; 703/8; 705/301
(58) Field of Classification Search .............. 700/98; 703/8; 705/301
  See application file for complete search history.

(56) References Cited

U.S. PATENT DOCUMENTS

| | | | |
|---|---|---|---|
| 4,697,240 A | 9/1987 | Cedar et al. | |
| 5,231,749 A | 8/1993 | Hutchison | |
| 5,380,978 A | 1/1995 | Pryor | |
| 5,729,463 A | 3/1998 | Koenig et al. | |
| 6,324,750 B1 * | 12/2001 | Saunders et al. | 29/721 |
| 6,446,697 B1 | 9/2002 | Shaikh et al. | |
| 6,975,971 B2 | 12/2005 | Tang | |
| 7,295,959 B2 | 11/2007 | Noma et al. | |
| 7,444,195 B2 | 10/2008 | Smith et al. | |
| 7,447,616 B2 * | 11/2008 | Wang et al. | 703/8 |
| 2003/0023686 A1 * | 1/2003 | Beams et al. | 709/205 |
| 2003/0084015 A1 * | 5/2003 | Beams et al. | 706/47 |
| 2004/0010398 A1 * | 1/2004 | Noma et al. | 703/1 |
| 2005/0096885 A1 | 5/2005 | Rhodes et al. | |
| 2006/0041448 A1 * | 2/2006 | Patterson et al. | 705/1 |
| 2006/0155402 A1 | 7/2006 | Read | |
| 2007/0038422 A1 * | 2/2007 | Wang et al. | 703/8 |
| 2009/0084933 A1 | 4/2009 | Appleby et al. | |
| 2011/0166824 A1 * | 7/2011 | Haisty et al. | 702/157 |

* cited by examiner

*Primary Examiner* — Mohammad Ali
*Assistant Examiner* — Anthony Whittington
(74) *Attorney, Agent, or Firm* — Dinsmore & Shohl LLP

(57) ABSTRACT

A computer-implemented method for rapidly forming a vehicle body model includes identifying a vehicle design using a computer. Sectioning data is determined by sectioning the vehicle design into multiple virtual sections using a design program implemented on the computer. The sectioning data is used by a machine to form multiple modeling sections that correspond to the multiple virtual sections. The multiple modeling sections are nested together to form the vehicle body model. The multiple modeling sections are fixed together once the vehicle body model is formed.

18 Claims, 3 Drawing Sheets

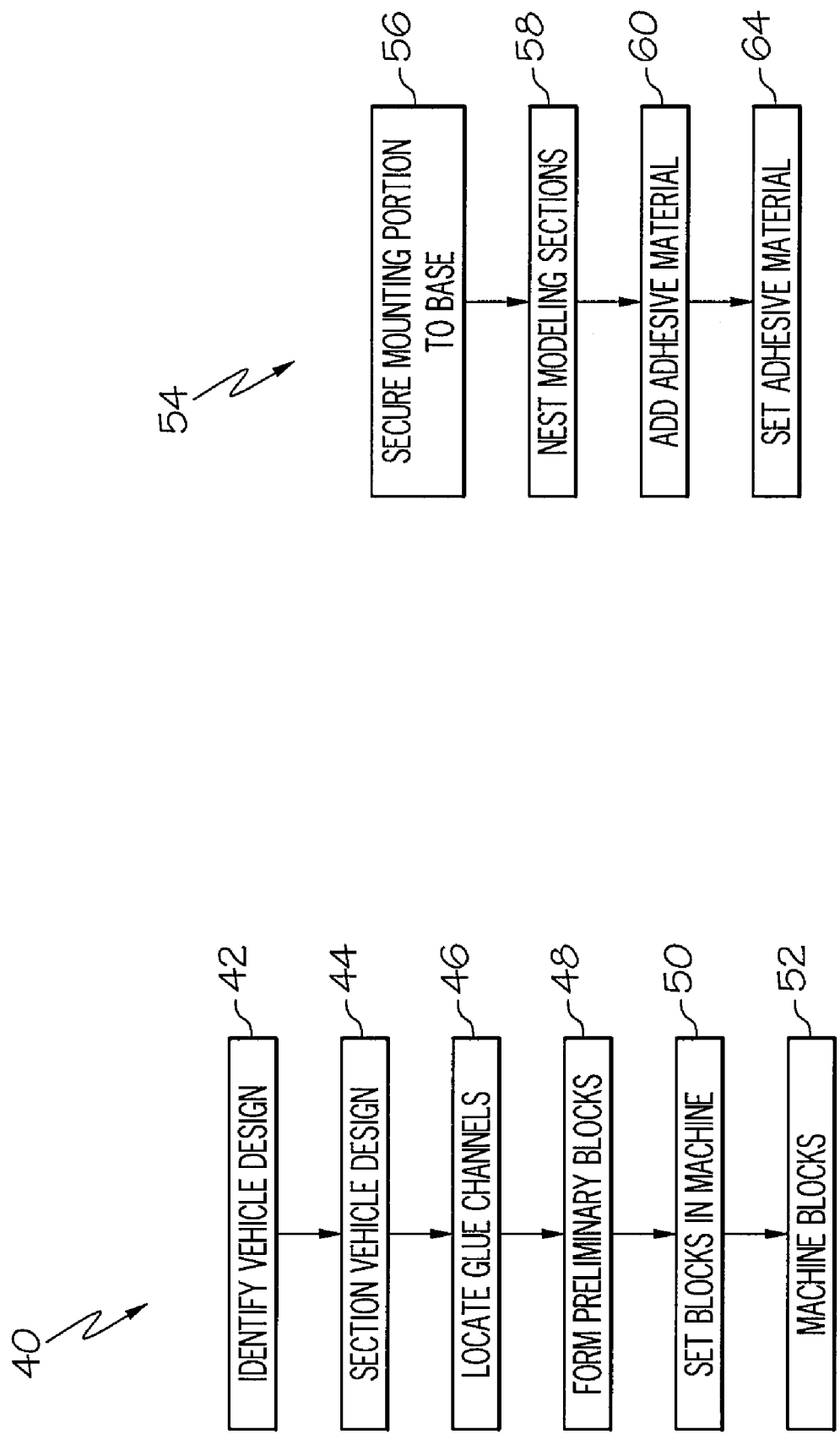

FORMING VEHICLE BODY MODELS AND OTHER OBJECTS

TECHNICAL FIELD

The present specification generally relates to modeling objects, and more particularly to modeling of vehicle body models.

BACKGROUND

It is common to model an interior and/or exterior of a vehicle body, for example, to provide designers with a life-size approximation of comfort and dimensions of a particular design. For example, a seating buck may be built, which is a full-size mockup of a vehicle's interior.

Typically, a vehicle body model is built using one or more large blocks of a modeling material, such as modeling board that are rough cut by hand and glued together to form a monolith. The monolith of modeling material may then be machined to finally rough and finally finish the vehicle model to its final shape. These large monoliths can be difficult to handle given their size and shapes. Additionally, cutting and gluing up the large monoliths can require a large amount of time and material and may add to the machining time required.

SUMMARY

In one embodiment, a computer-implemented method for rapidly forming a vehicle body model includes: (a) identifying a vehicle design using a computer; (b) determining sectioning data by sectioning the vehicle design into multiple virtual sections using a design program implemented on the computer; (c) providing a block of modeling material to a machine configured for machining the block; (d) the machine using the sectioning data determined in step (b) to machine the block into a modeling section corresponding to at least one of the virtual sections; (e) repeating steps (c) and (d) for each of the virtual sections; and (f) assembling the modeling sections formed in step (d) to form the vehicle body model.

In another embodiment, a computer-implemented method for rapidly forming a vehicle body model includes: identifying a vehicle design using a computer; determining sectioning data by sectioning the vehicle design into multiple virtual sections using a design program implemented on the computer, the sectioning data being used by a machine to form multiple modeling sections that correspond to the multiple virtual sections; nesting the multiple modeling sections together to form the vehicle body model; and fixing the multiple modeling sections together once the vehicle body model is formed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 illustrates a method for forming the vehicle body model of FIG. 1 according to one or more embodiments shown and described herein; and FIG. 5 illustrates a method for assembling the vehicle body model of FIG. 1 according to one or more embodiments shown and described herein.

DETAILED DESCRIPTION

Embodiments described herein generally relate to modeling of vehicle body models. The modeling process utilizes relatively small sections or blocks of modeling material that are machined and then assembled to form the model. As used herein, the term "vehicle body model," includes modeling of an entire vehicle body design or one or more portions of a vehicle body design including single components of a vehicle body design. For example, a vehicle body model may be of only an interior and/or exterior of a vehicle design. Additionally, a vehicle body model may be of only a particular component of a vehicle body design, such as a seat, steering column, floor, A-pillar, B-pillar, C-pillar, and the like.

Figure 1:
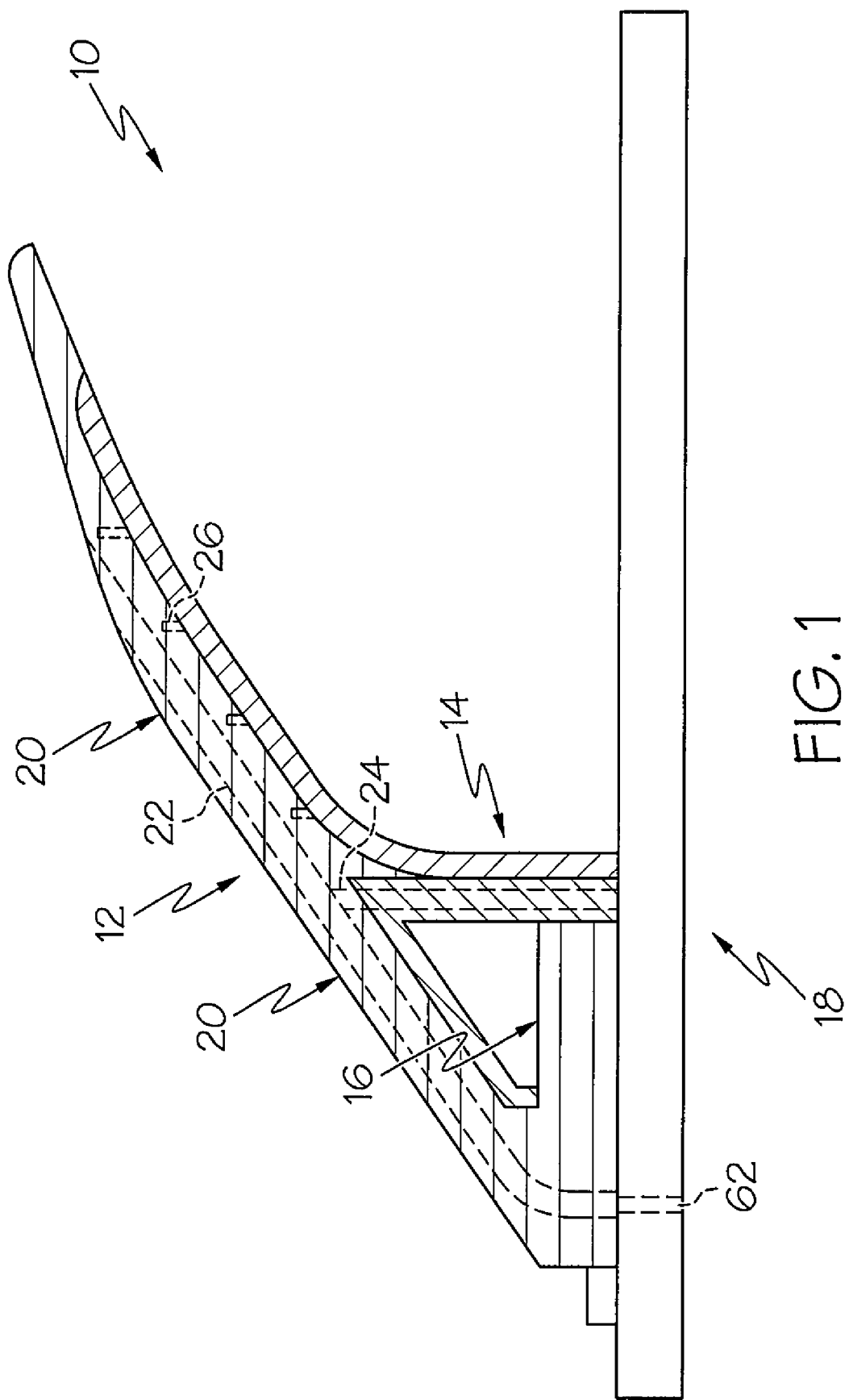
FIG. 1 is a side view of a vehicle body model according to one or more embodiments shown and described herein.

Referring to FIG. 1, an exemplary vehicle body model 10 is illustrated in an assembled configuration. In the illustrated embodiment, the vehicle body model 10 is in the form of an A-pillar of an automobile. The A-pillar of a vehicle is often the first pillar of the passenger compartment, usually surrounding the windscreen. The vehicle body model 10 includes a primary support member 12, a secondary support member 14 and a mounting portion 16 that is mounted to a base 18. The primary support member 12 and the secondary support member 14 both extend outwardly and vertically from the mounting portion 16 and intersect thereby forming the A-pillar shape. The mounting portion 16 may be fixedly mounted to the base 18, for example, using adhesive and/or mechanical fasteners. In some embodiments, the base 18 may be formed separate from the vehicle body model 10, for example, the base may be a sheet of wood, metal, plastic, and the like.

The vehicle body model 10 is formed of multiple modeling sections 20 that have been machined to their final shapes and assembled together. In the illustrated embodiment, the modeling sections 20 are held together using adhesive that is received within intersecting glue channels 22 and 24 formed by aligning glue holes formed in each individual section 20 during the machining process. Dowel holes 26 may also be provided and aligned during the assembly process into which dowels may be inserted and used to interconnect the multiple modeling sections 20.

Figure 2:
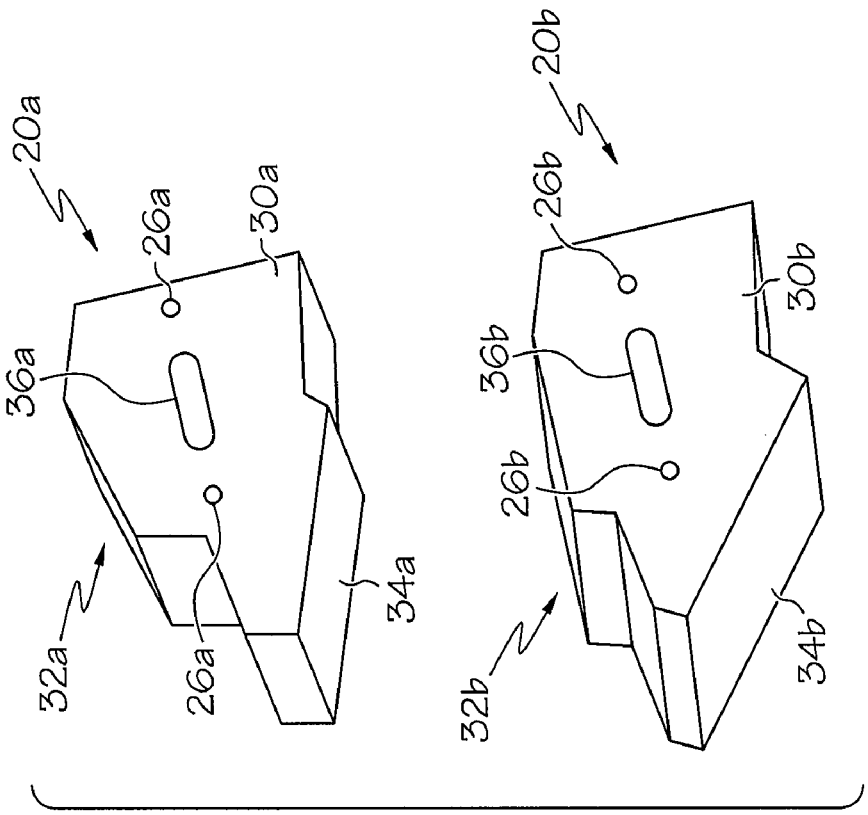
FIG. 2 is a top, perspective view of adjacent modeling sections side-by-side according to one or more embodiments shown and described.

FIG. 2 illustrates adjacent modeling sections 20a and 20b. The adjacent modeling sections 20a and 20b each include an upper nesting surface 30a and 30b, a lower nesting surface 32a and 32b and one or more sidewalls 34a and 34b forming an outer periphery of the modeling sections 20a and 20b. The lower nesting surface 32a of the modeling section 20a, in this example, is sized and configured to nest with the upper nesting surface 30b of the modeling section 20b.

Figure 3:
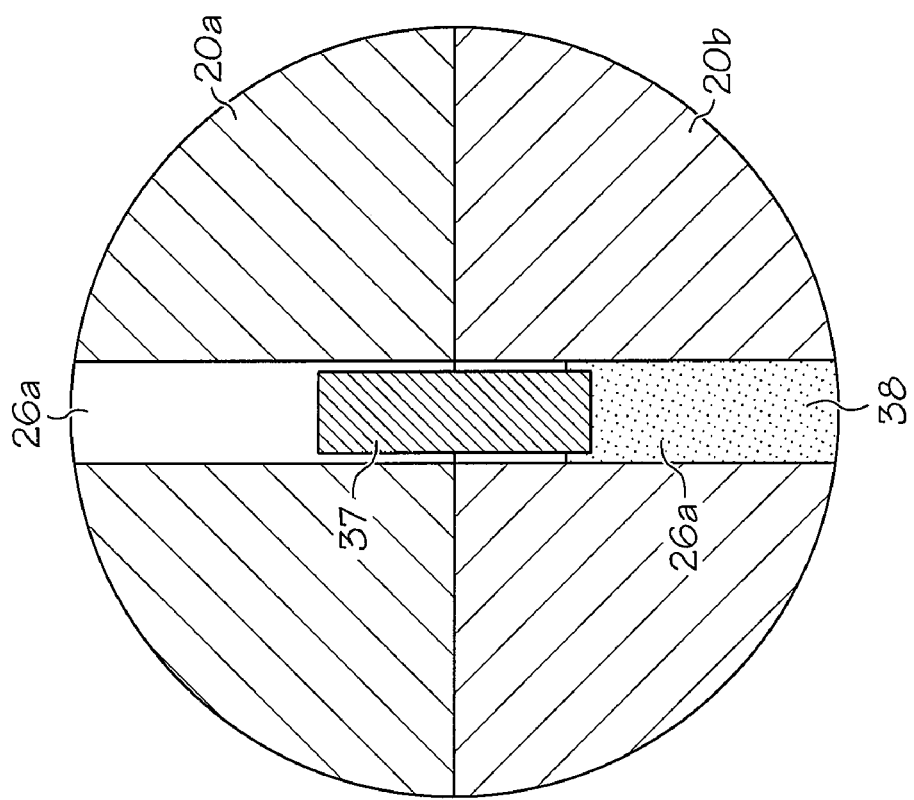
FIG. 3 is a detail, section view illustrating aligned dowel holes of adjacent modeling sections according to one or more embodiments shown and described.

The glue holes 36a and 36b extend from the upper nesting surfaces 30a and 30b to the lower nesting surfaces 32a and 32b and are each arranged to align together when the modeling sections 20a and 20b are nested together. The dowel holes 26a and 26b may also extend from the upper nesting surfaces 30a and 30b to the lower nesting surfaces 32a and 32b and are each arranged to align together when the modeling sections 20a and 20b are nested together. In some embodiments, one or more of the dowel holes 26a and 26b may extend only partially through the respective modeling section 20a and 20b. For example, referring briefly to FIG. 3 showing an assembled view of two dowel holes, the dowel hole 26a may terminate within the modeling section 20a, while the dowel hole 26b may extend entirely through the modeling section 20b. This can allow an appropriately sized dowel 37 to be inserted into the dowel hole 26b and into the dowel hole 26a such that the dowel 37 straddles both of the dowel holes 26a and 26b. The dowel 37 may then be glued into place using an adhesive material 38. Any other suitable method of affixing the dowel 37 into place may be used such as using another type of filler material or a friction fit.

Referring to FIG. 4, a process 40 for forming the vehicle body model 10 is illustrated. At step 42, using a computer aided design (CAD) program and a computer, a vehicle design saved in memory is identified. The vehicle design may be an entire vehicle, parts of the vehicle or just one or more components of the vehicle. In this exemplary embodiment, the vehicle design is of the A-pillar of the vehicle. At step 44, the vehicle design is divided into virtual sections using the design program thereby providing section information. In some embodiments, the design program may include logic for determining the sectioning of the vehicle design, for example, based at least in part on the stock modeling material being used and the shape and dimension of the vehicle design being sectioned. In some embodiments, the design program may allow a designer to section the vehicle design. As can be seen by FIG. 1, in this example, the vehicle design may be sectioned horizontally. However, other vehicle designs may be sectioned vertically, horizontally and/or at some other angle between horizontal and vertical.

Referring back to FIG. 4, the positions/paths of the glue channels 22 and 24 and the dowel holes 26 are determined and added to the vehicle design using the design program thereby providing glue hole location information and dowel hole location information at step 46. The design program may include logic for determining the positions/paths of the glue channels 22 and 24 and/or the dowel holes 26. In some embodiments, the design program may allow the designer to determine the positions/paths of the glue channels 22 and 24 and/or the dowel holes 26. In embodiments where, for example, fasteners may be used to fasten sections together rather than (or in addition to) the glue channels 22 and 24, the design program may be used to determine the positions for the fasteners.

At step 48, with the sizes and shapes of each section determined, preliminary blocks may be rough cut from the modeling material (e.g., by hand, water jet, etc.). In some embodiments, the blocks may be cut from a board of the modeling material. Any suitable preliminary work may be performed on the blocks in preparation for machining. At step 50, the blocks may then be set in a suitable machine, such as a CNC milling machine, which can utilize the section information, glue hole location information and dowel hole location information from the design program to machine each section. In some embodiments, because of the reduced size of the blocks, the CNC machine may be capable of machining multiple modeling sections simultaneously. At step 52, once the modeling sections are machined, final work may be done on the modeling sections, such as sanding.

Referring now to FIG. 5, a method 54 of assembling the vehicle body model 10 is shown. At step 56, the mounting portion 16 formed in the process 40 is secured to the base 18. The dowels 36 are then added to the dowel holes 26 such that the dowels 36 extend outwardly from the dowel holes 26 of the mounting portion 16. The next modeling section 20 is then nested against the mounting portion 16 with the dowel holes 26 of the next mounting section 20 receiving the dowels 36 at step 58. Step 58 is repeated for each next modeling section 20 until the vehicle body model 10 is assembled. Finally, the adhesive material (e.g., such as commercially available from ITW Plexus) may then be added to the glue channels 22 and 24 at step 60 thereby fixing the modeling sections 20 together. In some embodiments, the adhesive material may be added to the glue channels 22 and 24 under pressure to force the adhesive material entirely through the channels 22 and 24 and/or a vacuum may be drawn at an opposite end of the glue channels 22 and 24 (e.g., through openings 62 in a bottom of the mounting portion 16) to pull the adhesive material through the channels 22 and 24. At step 64, the adhesive material may be allowed to set thus completing the vehicle body model.

The above-described model making process can allow for rapid prototyping of full size vehicle body models by reducing the overall time required to create the vehicle body models. This reduction in time is accomplished by eliminating the time required to handle, cut and glue large blocks that are often set many times during machining. The milling machine used in the above-described model making process can be relatively small (e.g., 3-axis rather than 5-axis) and much of the lifting of the pre-machined blocks and modeling sections can be done manually instead of by hoist, for example. By using conformal glue channels any additional superstructure for supporting the vehicle body model can be reduced or eliminated, which can reduce overall cost. Updating portions of the vehicle body model can be accomplished quickly by remaking the one or more affected modeling sections prior to gluing or after gluing by cutting sections apart at the glue joint and adding a new glue channel to the new modeling section.

It should be noted that while the above description focuses on making and assembling a vehicle body model, other objects may be created using the above-described processes. For example, other objects may include medical equipment, anatomical structures, landscape objects, furniture, etc. Additionally, any suitable modeling materials may be used, such as wood, foams, plastics and combinations of materials.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A computer-implemented method for rapidly forming a vehicle body model, the method comprising:
    (a) identifying a vehicle design using a computer;
    (b) determining sectioning data by sectioning the vehicle design into multiple virtual sections using a design program implemented on the computer;
    (c) determining glue channel location information using the design program;
    (d) providing a block of modeling material to a machine configured for machining the block;

(e) the machine using the sectioning data determined in step (b) to machine the block into a modeling section corresponding to at least one of the virtual sections;

(f) repeating steps (d) and (e) for each of the virtual sections; and (g) assembling the modeling sections formed in steps (e) and (f) to form the vehicle body model.

2. The method of claim 1, wherein step (e) includes the machine using the glue channel location information in forming a glue hole in the modeling section.

3. The method of claim 2, wherein the glue hole extends from an upper nesting surface to a lower nesting surface.

4. The method of claim 3, wherein step (g) includes nesting a first modeling section with a second modeling section wherein the first modeling section includes a first glue hole and the second modeling section includes a second glue hole, the first and second glue holes being aligned to form at least part of a glue channel.

5. The method of claim 4, wherein step (g) includes providing an adhesive material through the glue channel.

6. A computer-implemented method for rapidly forming a vehicle body model, the method comprising:

(a) identifying a vehicle design using a computer;

(b) determining sectioning data by sectioning the vehicle design into multiple virtual sections using a design program implemented on the computer;

(c) determining dowel hole location information using the design program;

(d) providing a block of modeling material to a machine configured for machining the block;

(e) the machine using the sectioning data determined in step (b) to machine the block into a modeling section corresponding to at least one of the virtual sections;

(f) repeating steps (d) and (e) for each of the virtual sections; and (g) assembling the modeling sections formed in step (e) to form the vehicle body model.

7. The method of claim 6, wherein step (e) includes the machine using the dowel hole location information in forming a dowel hole in the modeling section.

8. The method of claim 7, wherein step (g) includes nesting a first modeling section with a second modeling section wherein the first modeling section includes a first dowel hole and the second modeling section includes a second dowel hole, the first and second dowel holes being aligned.

9. The method of claim 8, wherein step (g) includes providing a dowel in the first and second dowel holes such that the dowel straddles the first and second dowel holes.

10. A computer-implemented method for rapidly forming a vehicle body model, the method comprising:

identifying a vehicle design using a computer;

determining sectioning data by sectioning the vehicle design into multiple virtual sections using a design program implemented on the computer and determining glue channel location information using the design program implemented on the computer, the sectioning data and the glue channel location information being used by a machine to form multiple modeling sections that correspond to the multiple virtual sections;

nesting the multiple modeling sections together to form the vehicle body model; and fixing the multiple modeling sections together once the vehicle body model is formed.

11. The method of claim 10 comprising using the glue channel location information in forming a glue hole in the modeling sections.

12. The method of claim 11, wherein the glue hole extends from an upper nesting surface to a lower nesting surface of the modeling sections.

13. The method of claim 12 comprising nesting a first modeling section with a second modeling section wherein the first modeling section includes a first glue hole and the second modeling section includes a second glue hole, the first and second glue holes being aligned to form at least part of a glue channel.

14. The method of claim 13 further comprising providing an adhesive material through the glue channel.

15. The method of claim 10 further comprising determining dowel hole location information using the design program.

16. The method of claim 15 comprising using the dowel hole location information in forming a dowel hole in the modeling section.

17. The method of claim 16 comprising nesting a first modeling section with a second modeling section wherein the first modeling section includes a first dowel hole and the second modeling section includes a second dowel hole, the first and second dowel holes being aligned.

18. The method of claim 17 further comprising providing a dowel in the first and second dowel holes such that the dowel straddles the first and second dowel holes.

\* \* \* \* \*